United States Patent [19]

Phanopoulos et al.

[11] Patent Number: 5,750,201
[45] Date of Patent: May 12, 1998

[54] PROCESS FOR BINDING LIGNOCELLULOSIC MATERIAL

[75] Inventors: Christopher Phanopoulos, Tervuren; Jacobus Margareta Valentijn Vanden Ecker, Balen, both of Belgium

[73] Assignee: Imperial Chemical Industries PLC, Millbank, England

[21] Appl. No.: 616,796

[22] Filed: Mar. 15, 1996

[30] Foreign Application Priority Data

Apr. 13, 1995 [GB] United Kingdom ............ 95200936

[51] Int. Cl.$^6$ ........................................... B27N 1/00
[52] U.S. Cl. ................ 427/375; 427/384; 427/385.5; 427/389.9; 427/392; 427/393; 527/100; 527/103
[58] Field of Search ..................... 427/375, 384, 427/385.5, 389.9, 392, 393; 527/100, 103

[56] References Cited

U.S. PATENT DOCUMENTS

| 3,519,581 | 7/1970 | Moorer et al. | |
|---|---|---|---|
| 3,577,358 | 5/1971 | Santelli et al. | |
| 4,279,788 | 7/1981 | Lambuth. | |
| 4,344,798 | 8/1982 | Gaul et al. | 106/123 |
| 4,359,507 | 11/1982 | Gaul et al. | 428/425.1 |
| 4,361,662 | 11/1982 | Gaul et al. | 524/14 |
| 4,486,557 | 12/1984 | Gaul et al. | 523/446 |

FOREIGN PATENT DOCUMENTS

| 2029727 | 5/1992 | Canada. |
| 233681A1 | 2/1975 | Germany. |
| 4331656A1 | 9/1994 | Germany. |
| WO89/07497 | 8/1989 | WIPO. |

Primary Examiner—Nathan M. Nutter

[57] ABSTRACT

Process for binding lignocellulosic material using polyisocyanates in combination with lignin solvents and optionally lignin as binder.

13 Claims, No Drawings

PROCESS FOR BINDING LIGNOCELLULOSIC MATERIAL

This invention relates to a process for binding lignocellulosic material using polyisocyanates and to compositions for use in said process.

The molding of lignocellulosic material containing fibers, particles or layers to form composite bodies is well known. The binders which were normally used are the synthetic resin glues such as suspensions of urea-formaldehyde or phenol-formaldehyde resin in water. Composite bodies containing lignocellulosic produced in this way lack durability and are susceptible to moisture conditions and deterioration in certain building purposes to which they may be subjected. Organic di- and polyisocyanates as binders for lignocellulosic materials have been proposed and are known to give products of increased stability and mechanical strength. However even at reduced binder use levels the cost of polyisocyanates as compared to the urea-formaldehyde or phenol-formadehyde resin binders is unfavorable.

It is an object of the present invention to provide polyisocyanate-bound lignocellulosic bodies containing reduced polyisocyanate binder levels whilst retaining equivalent board properties.

It is another object of the present invention to provide polyisocyanate-bound lignocellulosic bodies having improved properties at equivalent loadings of polyisocyanate binder.

Therefore the present invention provides a process for binding lignocellulosic material comprising the steps of
a) bringing said lignocellulosic material in contact with an organic polyisocyanate composition and
b) subsequently allowing said material to bind, characterised in that said lignocellulosic material is also brought in contact with a lignin solvent either simultaneously with or separately from the organic polyisocyanate composition.

The advantage of the present invention is that levels of the polyisocyanate necessary to produce a cured pressed composite lignocellulosic body can be substantially reduced while maintaining equivalent or superior composite board physical properties. Further at equivalent levels of polyisocyanate composite bodies having improved physical properties such as strength and swelling are obtained. Also improved performance in release from the press platens is observed in some circumstances, especially in Medium Density Fiberboard production.

Lignin solvents as used herein are substances capable of dissolving the naturally occurring proto-lignin or lignin as modified by the process used for recovering it from lignocellulosic material. Preference is given to non-ioscyanate-reactive lignin solvents. Examples of suitable lignin solvents for use in the process of the present invention include cyclic ureas such as N,N'-dimethylethylene urea and N,N'-dimethylpropylene urea, acetol, dioxine, esters such as diethyl sulfate, ethyl oxalate and triethyl phosphate, polyesters, ketones such as acetone, isophorone, mesityl oxide, methyl ethyl ketone and pentanedione, 1,4-dioxane, dioxolane, methyl morpholine, morpholine, propylene oxide, tetrahydrofurfuryl alcohol, tetrahydrophrane, thialdine, acrylonitrile, 2-nitro-2-ethyl-1,3-propanediol (melted), 2-nitro-2-methyl-1-propanol (melted), dimethyl sulfolane, dimethyl sulfoxide, formamide, butyl alcohol and nitroethanol (and mixtures of these). Of these N,N'-dimethylethylene urea and N,N'-dimethylpropylene urea are preferred. Use of these two compounds as lignin solvent has not been described heretobefore. Only one of the above lignin solvents may be used in the process of the present invention or mixtures of two or more of such lignin solvents may be used.

The lignin solvents, especially the cyclic ureas, are used in the process of the present invention in an amount ranging from 0.1 to 6.0%, preferably 0.3 to 3% and most preferably 0.5 to 2% by weight based on the polyisocyanate.

The lignin solvent to be preferably used and the preferred amount thereof depends on the wood species and can be readily determined by the man skilled in the art.

By using a lignin solvent in combination with a polyisocyanate in the above amounts, boards of equivalent physical properties are obtained at a 15 to 20% reduction in polyisocyanate loading.

The lignin solvent can either by added to the polyisocyanate composition before the composition is brought into contact with the lignocellulosic material or the lignin solvent can be added to the lignocellulosic material before of after (preferably before) the polyisocyanate is added.

Polyisocyanate compositions containing the above lignin solvents in the above amount are stable. An inert diluent such as linseed oil, methyloleate, 2,3-dibenzyltoluene can be added to such a polyisocyanate composition.

Further reductions in polyisocyanate loadings whilst maintaining board properties are possible when adding both lignin and lignin solvent to the lignocellulosic material.

Lignins derived from a wide variety of sources may be employed. Exemplary are lignins resulting from kraft and soda wood-pulping processes such as alkali lignins (also called kraft and sulfate lignin), lignins resulting from sulfite wood-pulping processes such as ligninsulfonates, lignins resulting from hydrolysis of wood. The preferred lignins are organosolv lignin and alkali lignin. Lignins from hardwood and soft wood sources may be used.

Instead of lignin itself lignin models based on the monomer units of natural lignin (namely phenyl propane) can be used. Examples of lignin models include the compounds described by W. E. Collier et al. in Holzforschung, 46(6), page 523–528 (1992) especially materials based on $C_6H_5$—H and $C_6H_4(OCH_2)R$ wherein R is $CH(OH)CH_3$ or $CH_2CH(OH)C_6H_5$, the compounds described by L. Eggling in Trends in Biotechnology, 1(4), page 123–127 (1983) such as dilignols (two phenyl propane units), arylglycerol-β-aryl ether, 1,2-diarylpropane dilignols and phenylcoumaran dilignol, the compounds described by G. E. Haekes et al. in Holzforschung, 47, page 302–312 (1993) such as vanillin, vanillic acid, acetovanillone, syringaldehyde, 4-hydroxy-3, 5-dimethoxybenzoic acid, 4-hydroxybenzaldehyde, 4-hydroxybenzoic acid, 4-hydroxy-3,5-dimethoxyacetophenone, 4-hydroxycinnamic acid, 3,4-dihydroxycinnamic acid (caffeic acid), 4-hydroxy-3-methoxycinnamic acid (ferulic acid) and 4-hydroxy-3,4-dimethoxycinnamic acid, and the compounds described by D. K. Johnson et al. in "Molecular weight distribution studies using lignin model compounds", Chapter 8, page 104–123, edited by W. G. Glasser and S. Sarkanen, ACS Symp. Ser. 397 (1989), ISBN 0-8412-1631-2.

The lignin or lignin model is added in an amount ranging from 0.1 to 50%, preferably 1 to 5% by weight based on the polyisocyanate.

The lignin or lignin model can be added to the lignocellulosic material separately from the polyisocyanate and lignin solvent (preferably after the polyisocyanate has been added) or it can be added simultaneously with the polyisocyanate and/or lignin solvent. If added simultaneously the preferred method involves first mixing the lignin (model) and the lignin solvent and then adding the polyisocyanate thereto. Another method involves first adding the lignin (model) to the polyisocyanate and then the lignin solvent.

The combination of lignin solvent and lignin (model) can lead to a reduction in polyisocyanate loading of 20 to 40%.

The polyisocyanates for use in the process of the present invention may be any organic polyisocyanate compound or mixture of organic polyisocyanate compounds, provided said compounds have at least 2 ioscyanate groups. Organic polyisocyanates includes diisocyanates, particularly aromatic diisocyanates, and isocyanates of higher functionality. Examples of organic polyisocyanates which may be used in the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether. Modified polyisocyanates containing isocyanurate, carbodiimide or uretonimine groups may be employed as well. Further blocked polyisocyanates, like the reaction product of a phenol or an oxime and a polyisocyanate, may be used, having a deblocking temperature below the temperature applied when using the polyisocyanate composition. The organic polyisocyanate may also be an ioscyanate-ended prepolymer made by reacting an excess of a diisocyanate or higher functionality polyisocyanate with a polyol. Water-emulsifiable organic polyisocyanates like those described in UK patent no. 1444933, in European patent publication no. 516361 and in PCT patent publication no. 91/03082 can also be used. Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates. Such mixtures are well-known in the art and include the crude phosgenation products containing methylene bridged polyphenyl polyisocyanates, including diisocyanate, triisocyanate and higher polyisocyanates together with any phosgenation by-products. Preferred isocyanates to be used in the present invention are those wherein the ioscyanate is an aromatic diisocyanate or polyisocyanate of higher functionality such as a pure diphenylmethane diisocyanate or mixture of methylene bridged polyphenyl polyisocyanates containing diisocyanates, triisocyanates and higher functionality polyisocyanates. Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI. Preferably the polyisocyanate is liquid at room temperature.

The polyisocyanate composition further may comprise conventional additives like flame retardants, lignocellulosic preserving agents, fungicides, waves, sizing agents, fillers and other binders like formaldehyde condensate adhesive resins.

The lignocellulosic bodies are prepared by bringing the lignocellulosic parts into contact with the polyisocyanate composition and the lignin solvent like by means of mixing, spraying and/or spreading the polyisocyanate composition and the lignin solvent with/onto the lignocellulosic parts and by pressing the combination of the polyisocyanate composition, lignin solvent and the lignocellulosic parts, preferably by hot-pressing, normally at 150° C. to 220° C. and 2 to 6 MPa specific pressure. Such binding processes are commonly known in the art.

The lignocellulose material after treatment with the polyisocyanate composition and lignin solvent is placed on caul plates made of aluminium or steel which serve to carry the furnish into the press where it is compressed to the desired extent usually at a temperature between 150° C. and 220° C. At the start of a manufacturing run it may be helpful, but not essential, to condition the press plates by spraying their surfaces with an external release agent. The conditioned press may then be used many times in the process of the invention without further treatment.

The process of the present invention may be used in the manufacture of waferboard, medium density fiberboard and particle board (also known as chipboard).

Thus the lignocellulosic material used can include wood strands, woodchips, wood fibers, shavings, wood wool, cork, bark, sawdust and like waste products of the wood working industry as well as other materials having a lignocellulosic basis such as paper, bagasse, straw, flax, sisal, hemp, rushes, reeds, rice hulls, husks, grass, nutshells and the like. Additionally, there may be mixed with the lignocellulosic materials other particulate or fibrous materials such as mineral fillers, glass fiber, mica, rubber, textile waste such as plastic fibers and fabrics.

The weight ratio of polyisocyanate/lignocellulosic material will vary depending on the bulk density of the lignocellulosic material employed and properties required. Therefore, the polyisocyanate compositions may be applied in such amounts to give a weight ratio of polyisocyanate/lignocellulosic material in the range of 0.1:99.9 to 25:75 and preferably in the range of 0.3:99.7 to 16:84.

If desired, other conventional binding agents, such as formaldehyde condensate adhesive resins, may be used in conjunction with the polyisocyanate composition.

More detailed descriptions of methods of manufacturing products based on lignocellulosic material are available in the prior art. The techniques and equipment conventionally used can be adapted for use in the process of the present invention.

The invention is illustrated but not limited by the following examples. SUPRASEC is a trademark of Imperial Chemical Industries.

EXAMPLE 1

The lignin solvent was added to the polyisocyanate (SUPRASEC 2185 available from Imperial Chemical Industries) and stirred slowly for about 2 minutes at room temperature. The type and amount (based on the polyisocyanate) of lignin solvent is indicated below in Table 1. The resin was then sprayed onto the wood furnish at 3% loading (polyisocyanate+lignin solvent) in a drumblender with an air-atomised 0.7 mm nozzle. With the sprayed woodstrands 30×30×1.1 cm Oriented Strand Boards were made in a Siempelkamp press. The press platens were at a temperature of 200° C. Press profile used: closing in 45 sec to 130 bar, closed for 176 sec at 130 bar, pressure decrease in 15 sec from 130 bar to 0 bar. Physical board properties are given in Table 1. Swelling after 24 hours is determined according to standard DIN 42364. Internal Bond (IB) is determined according to standard DIN 52365 for V20 and DIN 68763 and DIN 52365 for V100.

Dimethylethylene urea (DMEU) available from Acros Chimica

Dimethylpropylene urea (DMPU) available from Acros Chimica

Aspen strands obtained from Weyerhaeuser, Drayton Valley

Southern Pine strands obtained from Weyerhaeuser, Elkin

TABLE 1

| | Swelling (%) | IB - V20 (kPa) | IB - V100 (kPa) |
|---|---|---|---|
| Southern Pine | | | |
| SUPRASEC 2185 | 33.07 | 752 | / |
| SUPRASEC 2185 + 0.5% DMEU | 28.39 | 844 | / |
| SUPRASEC 2185 + 1.0% DMEU | 27.19 | 1001 | / |
| Aspen | | | |
| SUPRASEC 2185 | 34.28 | 768 | 113 |
| SUPRASEC 2185 + 1.0% DMPU | 27.98 | 887 | 219 |

The above results show than even at reduced levels of polyisocyanate boards made according to the invention show improved swelling and internal bond strength.

EXAMPLE 2

Organosolv lignin (available from Repap Technologies Inc. under the name ALCELL Lignin Powder) 2 pbw per 100 pbw of polyisocyanate) was added slowly to the polyisocyanate (SUPRASEC 2185 available from Imperial Chemical Industries) with stirring at room temperature. Subsequently lignin solvent dimethylethylene urea (1 pbw per 100 pwb of polyisocyanate) was stirred in. The resin was then sprayed onto Aspen wood strands at 2% loading (polyisocyanate+lignin solvent+lignin) in a drumblender with an air-atomised 0.7 mm nozzle. With the sprayed woodstrands 30×30×1.1 cm Oriented Strand Boards were made in a Siempelkamp press. The press platens were at a temperature of 200° C. Press profile used: closing in 45 sec to 130 bar, closed for 176 sec at 130 bar, pressure decrease in 15 sec from 130 bar to 0 bar. Physical board properties are given in Table 2. Physical board properties of a reference board made with 2% SUPRASEC 2185 on its own are also given in Table 2.

TABLE 2

| | Swelling | IB |
|---|---|---|
| REFERENCE | 42.5 | 655 |
| SAMPLE | 32.5 | 977 |

EXAMPLE 3

Dispersions were made by mixing 5 pbw of dimethylethylene urea (available from Aldrich) in 93 pbw of polyisocyanate (SUPRASEC 2185 available from Imperial Chemical Industries). While stirring 2 pbw of lignin was added slowly to this mixture and stirred for 15 minutes. Single lapjoints of Aspen were prepared from the obtained polyisocyanate compositions and cured in an oven for 30 minutes at 180° C. clamped in a L-clamp. The lapjoints were constructed using two 10–12 cm×25 mm×3 mm cut wood with an overlap distance of 25mm. Adhesive was applied to both faces of the overlap (30 mm deep) at a loading of 12–18 g/m$^2$. Tensile strengths of the obtained lapjoints were measured; 3 mm spacers were used to achieve parallel strain and minimise peeling forces. Results are presented in Table 3.

The reference used is polyisocyanate (SUPRASEC 2185). The different lignins used are organosolv lignin (available from Repap Technologies), alkali lignin (available from Aldrich), hydrolytic lignin (available from Aldrich) and sodium lignosulfonate (available from Aldrich).

TABLE 3

| | Tensile strength (kPa) |
|---|---|
| Reference | 2821 |
| Organosolv lignin | 3172 |
| Alkali lignin | 3135 |
| Hydrolytic lignin | 3013 |
| Sodium lignosulfonate | 2988 |

EXAMPLE 4

A composition of polyisocyanate SUPRASEC 1042 (available from Imperial Chemical Industries) emulsified in water at 50:50 ratio was prepared and 2% by weight of DMEU was added hereto. Bestwood fiber boards of 18×18× 0.6 cm were made using this polyisocyanate composition at 6% loading (board density 800 kg/m$^2$). Moisture content of the premat: 12%. Temperature of press plates: 200° C. Releasability of the boards from the press platens was rated from 1 to 5; 1 being complete sticking of the board to the press platens and 5 being perfect release from the press platens. Wood failure was also measured as the percentage area of the press platen covered with wood fibers after taking away the board. Results are presented in Table 4. The reference is SUPRASEC 1042 emulsified in water at 50:50 ratio.

TABLE 4

| | Releasability | Woodfailure |
|---|---|---|
| REFERENCE | 4.5 | 0.5–1 |
| REFERENCE + 2% DMEU | 4.5–5 | 0 |

These results show that release performance is improved by adding a lignin solvent to the polyisocyanate.

We claim:

1. Process for binding lignocellulosic material comprising the steps of
   a) brining said lignocellulosic material in contact with an organic polyisocyanate composition and
   b) subsequently allowing said material to bind, characterised in that said lignocellulosic material is also brought into contact with a lignin solvent which is a cyclic urea, either simultaneously with or separately from the organic polyisocyanate composition.

2. Process according to claim 1 wherein the lignin solvent is N,N'-dimethylethylene urea or N,N'-dimethylpropylene urea.

3. Process according to claim 1 wherein the lignin solvent is used in an amount ranging from 0.1 to 6% by weight based on the polyisocyanate.

4. Process according to claim 3 wherein the lignin solvent is used in an amount ranging from 0.5 to 2% by weight based on the polyisocyanate.

5. Process according to claim 1 wherein said lignocellulosic material is also brought into contact with lignin or a lignin model either simultaneously with or separately from the polyisocyanate composition and/or the lignin solvent.

6. Process according to claim 5 wherein the lignin is organosolv lignin or alkali lignin.

7. Process according to claim 5 wherein the lignin or lignin model is used in an amount ranging from 1 to 5% by weight based on the polyisocyanate.

8. Process according to claim 5 wherein the lignin or lignin model is used in an amount ranging from 1 to 5% by weight based on the polyisocyanate.

9. Process according to claim 8 wherein the organic polyisocyanate is methylene bridged polyphenyl polyisocyanate.

10. Process according to claim 1 wherein step b) involves hot-pressing the combination of the lignocellulosic material, the polyisocyanate composition, the lignin solvent and optionally the lignin or lignin model.

11. Polyisocyanate composition comprising N,N'-dimethylethylene urea or N,N'-dimethylpropylene urea.

12. Polyisocyanate composition according to claim 11 wherein N,N'-dimethylethylene urea or N,N'-dimethylpropylene urea is used in an amount ranging from 0.1 to 6% by weight.

13. Polyisocyanate composition according to claim 12 wherein N,N'-dimethylethylene urea or N,N'-dimethylpropylene urea is used in an amount ranging from 0.5 to 2% by weight.

* * * * *